Feb. 11, 1969  R. T. DENYES  3,426,401
HOSE CLAMP
Filed Feb. 2, 1967

INVENTOR.
Richard T. Denyes
BY
Barnard, McGlynn & Reising
ATTORNEYS

United States Patent Office 3,426,401
Patented Feb. 11, 1969

3,426,401
HOSE CLAMP
Richard T. Denyes, 1536 Dorchester,
Birmingham, Mich. 48008
Filed Feb. 2, 1967, Ser. No. 613,558
U.S. Cl. 24—278                          15 Claims
Int. Cl. F16l 33/081, 33/10

ABSTRACT OF THE DISCLOSURE

A hose clamp including a pair of wire-like members having a substantially circular cross section and extending about the major portion of the circumference of the clamp and attached to a pair of coacting band strips which provide the remaining portion of the circumference of the clamp and which coact with a fastener which changes the circumference of the clamp by moving the band strips circumferentially and relative to one another.

---

The prior art hose clamps are of two general types. The first type is commonly referred to as the band clamp and includes a band strip extending circumferentially about the clamp with the ends thereof coacting with a fastener means to move the ends circumferentially and relative to one another for changing the circumference of the clamp as, for example, to tighten the band strip about a hose and seal the hose to a fitting. The other type hose clamp is commonly referred to as the wire grip clamp. The wire grip clamp typically utilizes a length of wire having a circular cross section. Normally, the wire has a loop disposed about one end of a male screw or bolt with parallel spaced reaches thereof extending circumferentially about the clamp and looped about a female member which threadedly coacts with the male screw or bolt. The fastening means, therefore, includes a screw which coacts with a female member, such as a nut, to change the circumference of the clamp. The screws associated with wire grip clamps are, therefore, necessarily disposed tangentially with respect to the circumference of the clamp.

The band clamp utilizes one of two types of fastener means. One is a worm-type fastener where a helically threaded member is disposed tangentially with respect to the clamp circumference and coacts with slots in the band to change the circumference of the band as the threaded member is rotated. The significant disadvantage of this type of band clamp is that it is expensive due to the fact that it requires more complex manufacturing equipment. The other type of fastener which is utilized with the band-type clamp is one employing a threaded male member which extends radially with respect to the circumference of the clamp and threadedly engages a female nut. The ends of the band strips are disposed over the nut and extend through a restraining member so that upon rotation of the male member, the nut is moved radially away from the circumference of the clamp and away from the restraining member to pull portions of the band strips radially away from the circumference of the clamp to decrease the circumference of the clamp. One of the advantages of the band-type clamps over the wire grip clamps is the fastening means employed and particularly the fastening means utilizing a male threaded member disposed radially away from the circumference of the clamp. The disposition of a male threaded member radially with respect to the circumference of the clamp provides a fastening means which is easily accessible when disposing the clamp on a hose for tightening the hose about a fitting. The band-type clamps, however, do have certain disadvantages, one of the most important being that, as compared to the wire-type clamps, more torque is required to tighten a band clamp than is required to tighten a comparable wire grip clamp. For example, in one example twenty-five to thirty inch pounds is required to tighten a band clamp whereas a comparable wire grip clamp requires only ten to eighteen inch pounds. Particularly in the band-type clamp utilizing the radially disposed male threaded member, the band strip must be readily deformable so that it may be pulled upwardly and radially away from the circumference of the clamp for tightening. This in turn means that the circumference of the clamp defined by the band strip is very easily deformed. Thus, frequently during the handling of a band-type clamp, such as during the installation on a hose, the band strip is deformed so that the clamp takes one of many configurations other than the desired circular configuration. Furthermore, in comparison to the wire grip clamp, the band clamp has poorer sealing capabilities when clamping a hose to a fitting. The wire grip clamp having the parallel spaced wires provides a double seal in that each of the wires concentrates the force applied to the hose and, in addition, provides spaced parallel sealing lines. Furthermore, the band-type clamps provide poor sealing in the portion of the circumference which is coextensive with the fastening means.

The advantages of the wire grip clamp over the band-type clamp are, therefore, rigidity to maintain a substantially circular configuration, the requirement of less torque for tightening, and better sealing of a hose to a fitting. A recent and important development in the hose clamp art provides another advantage of the wire grip clamp over that of the band clamp. That development has been to preassemble a hose clamp in radially loose relationship about the end of a hose by including means for securing the clamp in such a position in the hose. More specifically, the hose clamp is stitched or stapled in a preassembled position on the hose before the hose is installed. The wire grip type clamp is very satisfactory in such a preassembly because one or both of the spaced parallel wires may be stapled to the hose to position the hose clamp both axially and circumferentially in radially loose relation to the end of the hose. After the wire grip-type clamp has been stitched or stapled to a hose in this manner, the preassembly is frequently installed in a position where the tangentially disposed fastening means of the wire grip clamp is inaccessible for tightening of the clamp. However, there has been provided in the prior art no satisfactory wire grip clamp which utilizes a fastening means having a radially disposed male threaded member which is readily accessible for tightening of the clamp about a hose.

Accordingly, it is an object and feature of this invention to provide a novel hose clamp which in function attains new and useful results not attainable in any of the prior art devices.

Another object and feature of this invention is to provide a novel hose clamp having circumferential rigidity, excellent sealing characteristics while requiring a minimum of torque for tightening, and which may utilize a fastening means disposed either tangentially or radially with respect to the circumference of the clamp.

In general, these and other objects and features of this invention may be attained in one of various embodiments which include a pair of band strips forming a small portion of the circumference of the clamp and at least one wire-like member forming the remaining portion of the circumference of the clamp and attached to the two band strips and further including fastener means coacting with the band strips for moving the band strips circumferentially and relative to one another to change the circumference of the clamp.

Other objects and attendant advantages of the present invention will be readily appreciated as the same becomes better understood by reference to the following detailed description when considered in connection with the accompanying drawings wherein.

Figure 1:
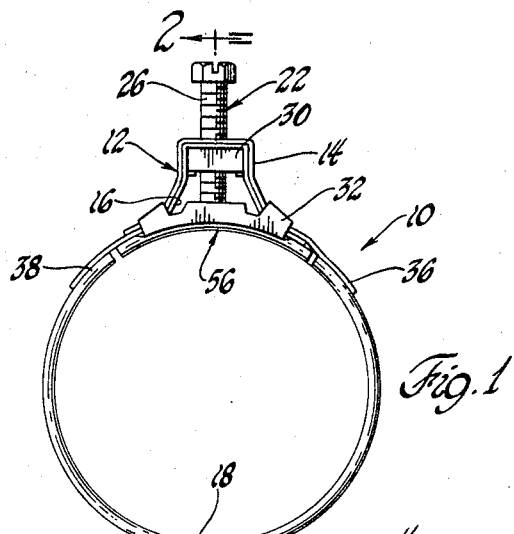
FIGURE 1 is an elevational view of a first embodiment.

Referring now to the drawings, wherein like numerals indicate like or corresponding parts throughout the several views and throughout the several embodiments, a substantially circular hose clamp is generally shown at 10. The hose clamp 10 comprises a band means, generally indicated at 12, and forming a relatively small portion of the circumference of the clamp 10. The band means 12 includes the band strips 14 and 16.

There is also included the wire-like members 18 and 20, each of which has a substantially circular cross section. The wire-like members 18 and 20 are of substantially less width than the band strips 14 and 16 and form the remaining and major portion of the circumference of the clamp.

Figure 3:
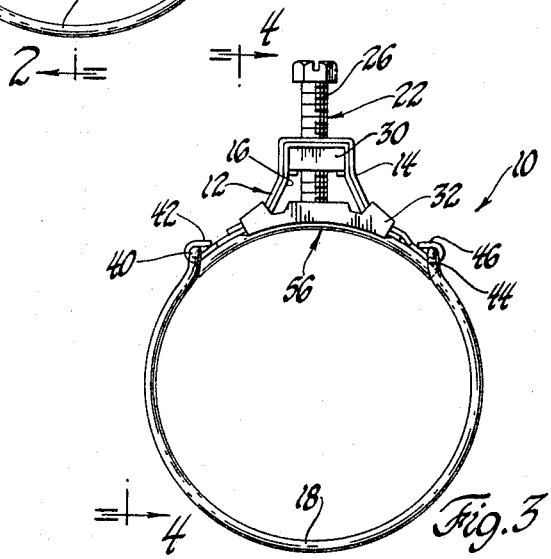
FIGURE 3 is an elevational view of a second embodiment.
Figure 4:
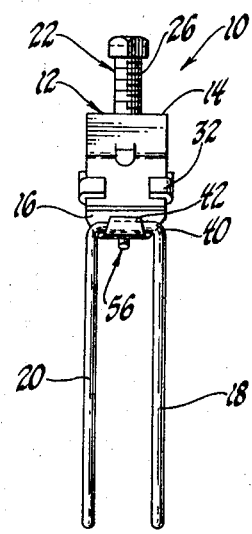
FIGURE 4 is a view taken substantially along line 4—4 of FIGURE 3.
Figure 5:
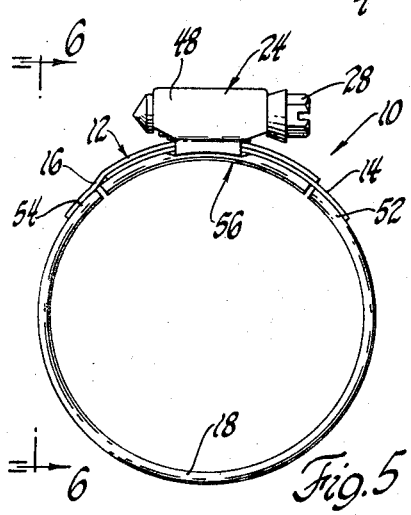
FIGURE 5 is an elevational view of another embodiment.
Figure 6:
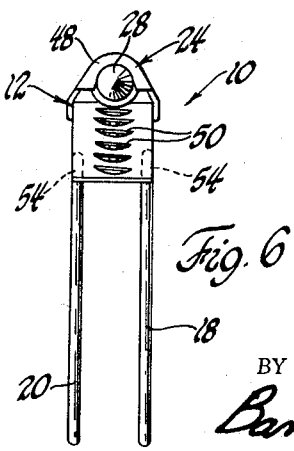
FIGURE 6 is a view taken substantially along line 6—6 of FIGURE 5.

There is also included fastener means, generally indicated at 22 in FIGURES 1 through 4 and generally indicated at 24 in FIGURES 5 and 6. The fastener means coact with the band strips 14 and 16 of the band means 12 for changing the circumference of the clamp. More specifically, the fastener means 22 includes a rotative threaded means for moving the band strips 14 and 16 circumferentially relative to one another. The rotative threaded means is shown at 26 in FIGURES 1 through 4 and is disposed radially with respect to the clamp. The rotative threaded means is shown at 28 in FIGURES 5 and 6 and is disposed tangentially with respect to the clamp.

The threaded means 26 in FIGURES 1 through 4 is a screw or bolt which threadedly engages a female threaded nut 30. The band strips 14 and 16 are disposed over the nut 30 and have apertures therein through which the bolt 26 extends. The fastener means 22 also includes a retainer 32 to guide the band strips 14 and 16 and against which the bolt 26 bears as indicated at 34 in FIGURE 2. In the embodiments illustrated in FIGURES 1 through 4, the bolt 26 has been rotated so as to at least partially decrease the circumference of the clamp by moving the nut 38 upwardly, thus pulling the band strips 14 and 16 upwardly, or radially away from the circumference of the clamp.

Figure 2:
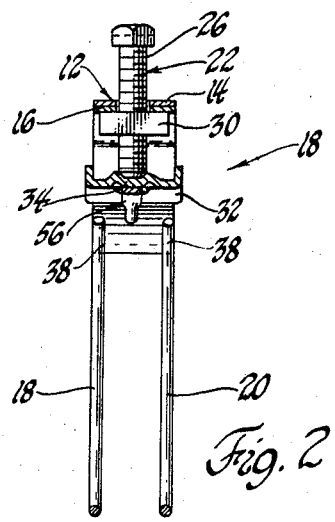
FIGURE 2 is a cross-sectional view taken substantially along line 2—2 of FIGURE 1.

In the embodiment illustrated in FIGURES 1 and 2, the wire-like members 18 and 20 are spaced, substantially parallel, and extend substantially coextensively with one another and the respective ends thereof are rigidly secured to the ends of the band strips 14 and 16 as respectively indicated at 36 and 38. The ends of the wire-like members 18 and 20 in the embodiment of FIGURES 1 and 2 may be secured to the band strips 14 and 16 in any appropriate manner such as by welding, brazing, or the like.

In the embodiment illustrated in FIGURES 3 and 4, the wire-like members 18 and 20 are disposed relative to one another as in FIGURES 1 and 2 but, in addition, are integrally joined to form a loop 40. In other words, the wire-like members 18 and 20 in the embodiment of FIGURES 3 and 4 are of one continuous length of wire. The band strip 16 in the embodiment of FIGURES 3 and 4 includes an attachment means comprising a rearwardly bent portion 42 for retaining the loop thereto. The opposite ends of the wire-like members 18 and 20 in the embodiment of FIGURES 3 and 4 may be integrally joined to form another loop which is attached to the band 14 by a rearwardly bent portion 46; however, in FIGURES 3 and 4 the wire-like members 18 and 20 include bent end portions, one of which is shown at 44 in FIGURE 3, which extend toward one another and abut one another and are retained to the band strip 14 by the reversely bent portion 46. The embodiment illustrated in FIGURES 3 and 4 may be assembled in the field because the wire-like members 18 and 20 may be positioned as shown and thereafter the reversely bent portions 42 and 46 of the band strips 14 and 16 may be crimped, swaged, or otherwise secured to maintain the wire-like members 18 and 20 in retention with the band strips 14 and 16. Thus, in the embodiment illustrated in FIGURES 3 and 4, the wire-like members 18 and 20, which are formed of an integral length of wire, extend from the loop 40 to the ends thereof which are bent to abut one another and are retained in position by the reversely bent portion 46 of the band strip 14.

In the embodiment illustrated in FIGURES 5 and 6, the fastener means 24 includes the male threaded member 28 which is rotatably disposed in the housing 48 and threadedly coacts with the slots 50 in the band strip 16. Thus, upon rotation of the threaded member 28, the band strips 14 and 16 of the embodiment of FIGURE 6 move circumferentially and relative to one another to change the circumference of the clamp. As in the embodiments of FIGURES 1 and 2, the wire-like members 18 and 20 in the embodiment of FIGURES 5 and 6 are rigidly secured to the band strips 14 and 16. Such rigid securement may be by welding, brazing, or any other appropriate means.

There is also included in each of the embodiments illustrated a saddle means generally indicated at 56 and comprising at least one wire. The saddle means is disposed on the retainer 32 in the embodiments of FIGURES 1 through 4 and on the housing 48 in the embodiment of FIGURES 5 and 6. The wire which comprises the saddle means 56 extends circumferentially substantially between the end portions of the wire-like members 18 and 20 where they are attached or retained to the band strips 14 and 16. The purpose of the wire comprising the saddle means 56 is to apply forces to a hose upon which the clamp is disposed to obtain excellent sealing between the hose and the fitting upon which it is disposed. It will be understood, of course, that more than one wire or other equivalent means may be utilized. As is illustrated in FIGURE 2, the wire 56 may be flattened slightly if necessary to provide a substantially circular inner periphery of the clamp although in some cases this would not be necessary as, for example, the embodiment of FIGURES 5 and 6.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A substantially circular hose clamp comprising; band means defining a relatively small portion of the circumference of said clamp and including a pair of circumferentially overlapping band strips, at least one wire-like member having a substantially circular cross-section with one end thereof attached to one of said strips and the other end thereof attached to the other of said strips so as to define the remaining portion of the circumference of said clamp, and fastener means coacting with said band strips for moving at least the portions of said band strips connected to said wire-like member circumferentially relative to one another for changing the circumference of said clamp.

2. A hose clamp as set forth in claim 1 including saddle means disposed adjacent said band means and extending circumferentially substantially between the end portions of said wire-like member.

3. A hose clamp as set forth in claim 2 wherein said saddle means comprises a wire-like member secured to the radially inwardly band strip.

4. A house clamp as set forth in claim 2 including a second wire-like member which is spaced, substantially parallel, and substantially coextensive with the first-mentioned member.

5. A hose clamp as set forth in claim 4 including saddle means disposed radially inward of said band means and extending circumferentially substantially between the ends of said wire-like members.

6. A hose clamp as set forth in claim 4 wherein the ends of said wire-like members are rigidly secured to said band means.

7. A hose clamp as set forth in claim 6 wherein said fastener means includes a rotative threaded means for moving said band strips circumferentially relative to one another.

8. A hose clamp as set forth in which claim 7 wherein said threaded means is disposed radially with respect to said clamp.

9. A hose clamp as set forth in claim 7 wherein said threaded means is disposed tangentially with respect to said clamp.

10. A hose clamp as set forth in claim 4, wherein said wire-like members are integrally joined to form at least one loop, and said band means includes first attachment means for retaining said loop thereto.

11. A hose clamp as set forth in claim 10 wherein said wire-like members extend circumferentially from said loop to bent end portions which extend toward one another and said band means includes second attachment means for retaining said bent end portions thereto.

12. A hose clamp as set forth in claim 11 wherein said first attachment means comprises a rearwardly bent portion of one of said band strips and said second attachment means comprises a rearwardly bent portion of the other of said band strips.

13. A hose clamp as set forth in claim 12 wherein said fastener means includes a rotative threaded means for moving said band strips circumferentially relative to one another.

14. A hose clamp as set forth in claim 13 wherein said threaded means is disposed radially with respect to said clamp.

15. A hose clamp as set forth in claim 13 wherein said threaded means is disposed tangentially with respect to said clamp.

References Cited

UNITED STATES PATENTS

| | | | |
|---|---|---|---|
| 453,359 | 6/1891 | McRae | 138—99 |
| 1,304,546 | 5/1919 | D'Arcy | 24—283 |
| 1,992,505 | 2/1935 | Prosky | 24—274 |
| 2,008,669 | 7/1935 | Hornung | 24—283 |
| 2,183,175 | 12/1939 | Tetzlaff | 24—278 |
| 2,688,170 | 9/1954 | Balzer | 24—279 |
| 3,086,270 | 4/1963 | Zartler | 24—278 |

DONALD A. GRIFFIN, *Primary Examiner.*

U.S. Cl. X.R.

24—274